United States Patent
Kuhlmann et al.

(10) Patent No.: US 11,414,542 B2
(45) Date of Patent: Aug. 16, 2022

(54) IMPREGNATION RESIN MIXTURE

(71) Applicant: Hexion Inc., Columbus, OH (US)

(72) Inventors: Gunda Kuhlmann, Hamm (DE); Christoph Scheuer, Dinslaken (DE); Panagiotis Saltapidas, Datteln (DE)

(*) Notice: Subject to any disclaimer, the term of this patent is extended or adjusted under 35 U.S.C. 154(b) by 50 days.

(21) Appl. No.: 16/646,941

(22) PCT Filed: Sep. 19, 2018

(86) PCT No.: PCT/EP2018/075276
§ 371 (c)(1),
(2) Date: Mar. 12, 2020

(87) PCT Pub. No.: WO2019/057737
PCT Pub. Date: Mar. 28, 2019

(65) Prior Publication Data
US 2020/0270446 A1  Aug. 27, 2020

(30) Foreign Application Priority Data

Sep. 25, 2017 (DE) .................. 102017008925.6

(51) Int. Cl.
| | | |
|---|---|---|
| *C08J 5/24* | (2006.01) | |
| *C08G 59/22* | (2006.01) | |
| *C08G 59/24* | (2006.01) | |
| *C08G 59/32* | (2006.01) | |
| *C08G 59/40* | (2006.01) | |
| *C08G 59/68* | (2006.01) | |
| *C08G 59/72* | (2006.01) | |
| *C08L 63/00* | (2006.01) | |
| *C08G 59/06* | (2006.01) | |
| *C08G 59/12* | (2006.01) | |
| *H01B 3/40* | (2006.01) | |
| *C08G 59/62* | (2006.01) | |
| *B32B 27/26* | (2006.01) | |
| *B32B 27/38* | (2006.01) | |
| *C08K 5/1545* | (2006.01) | |

(52) U.S. Cl.
CPC ............ *C08L 63/00* (2013.01); *C08G 59/063* (2013.01); *C08G 59/12* (2013.01); *C08G 59/24* (2013.01); *C08G 59/245* (2013.01); *C08G 59/32* (2013.01); *C08G 59/3218* (2013.01); *C08G 59/4014* (2013.01); *C08G 59/4078* (2013.01); *C08G 59/626* (2013.01); *C08G 59/72* (2013.01); *C08J 5/24* (2013.01); *C08J 5/248* (2021.05); *C08J 5/249* (2021.05); *H01B 3/40* (2013.01); *B32B 27/26* (2013.01); *B32B 27/38* (2013.01); *C08K 5/1545* (2013.01)

(58) Field of Classification Search
None
See application file for complete search history.

(56) References Cited

U.S. PATENT DOCUMENTS

| | | |
|---|---|---|
| 3,294,743 A | 12/1966 | Mack |
| 3,382,210 A | 5/1968 | Wyart et al. |
| 3,493,630 A | 2/1970 | Salensky |
| 3,823,200 A | 7/1974 | De et al. |
| 3,838,094 A | 9/1974 | Sporck |
| 4,652,619 A | 3/1987 | Nakajima et al. |
| 4,701,378 A | 10/1987 | Bagga et al. |
| 4,704,322 A | 11/1987 | Roberts |
| 5,250,638 A | 10/1993 | Su et al. |
| 5,955,195 A | 9/1999 | Moireau |
| 2004/0063896 A1 | 4/2004 | Markovits et al. |
| 2005/0259212 A1 | 11/2005 | Lee et al. |
| 2006/0147715 A1 | 7/2006 | Lee et al. |
| 2010/0298467 A1 | 11/2010 | Stammer et al. |
| 2011/0269902 A1 | 11/2011 | Strunk et al. |
| 2013/0091778 A1* | 4/2013 | Arnaud ................ C08L 63/00 51/298 |
| 2018/0204650 A1 | 7/2018 | Huber et al. |
| 2019/0292426 A1 | 9/2019 | Dressen et al. |

FOREIGN PATENT DOCUMENTS

| | | | | |
|---|---|---|---|---|
| CN | 103467763 | | 12/2013 | |
| JP | H11-215753 | | 8/1999 | |
| JP | 2003238659 A | * | 8/2003 | ............ C08G 59/56 |
| RU | 2010367 | | 3/1994 | |
| WO | WO-2016018191 A1 | * | 2/2016 | ............ C08L 67/04 |

OTHER PUBLICATIONS

Machine translation of JP-2003238659-A (no date).*

* cited by examiner

*Primary Examiner* — Michael J Feely

(57) ABSTRACT

The invention relates to an impregnation resin mixture and to the use thereof. In one embodiment, an impregnation resin mixture includes a) at least one epoxide resin component selected from the group consisting of polyepoxides based on bisphenol A and/or F, and advancement resin produced therefrom, based on epoxidized halogenated bisphenols and/or epoxidized novolaks and/or polyepoxide esters based on phthalic acid, hexahydrophthalic acid, or based on terephthalic acid, epoxidized polyaddition products from dicyclopentadiene and phenol or cycloaliphatic compounds, b) as reactive diluents, 2 to 30 wt. % lactones with respect to the sum of the epoxy resin components, c) BCl3 and/or BCl3 complexes and/or a compound selected from the group of imidazoles and d) optionally additional additives, wherein the impregnation resin mixture does not contain any carboxylic acid anhydrides.

8 Claims, No Drawings

IMPREGNATION RESIN MIXTURE

The invention relates to an impregnation resin mixture and use thereof, in particular for the insulation of electrical components.

The insulation system in high-voltage devices, e.g. motors or generators, has the task of providing long lasting electrical insulation of electrically conductive constituents, for example wires, coils or bars, in relation to one another and in relation to the laminated stator core or the environment.

In the insulation method generally used, an insulation tape, e.g. mica tape, is wound around the conductor to be insulated in order to counter the effects of partial discharges due to cumulative charge migrations, the final result of which can be electrical breakdown of the insulator.

Production of an insulation tape (e.g. mica tape) involves use of an adhesive for adhesive bonding of a mica paper, frequently produced from a mica pulp (comprising muscovite and phlogopite) with use of a binder, to a strong backing tape, an example being woven fabric, nonwoven fabric or foil made of, for example, glass, rockwool, polyester or polyimide. Adhesives used comprise resin compositions which have high strength at room temperature, in order to ensure the bonding of mica and backing, and which become liquid at elevated temperatures (60° C.-150° C.). This ensures that they can be applied in the form of liquid adhesive at elevated temperature or in a mixture with a volatile solvent. After cooling or removal of the solvent, the adhesive is strong but nevertheless flexible, thus permitting secure winding of the mica tape around the conductor part at room temperature, while its adhesive properties prevent delamination of the mica paper from the backing material. The adhesive generally comprises, as resin component, an epoxy resin, which by virtue of its conductivity parameters has very good suitability for this purpose. The adhesive moreover comprises an accelerator component which serves to initiate the hardening of the epoxy resin-based impregnation resin that is then applied (e.g. anhydride curing); only specifically selected accelerators have been suitable for this purpose, because it has been necessary to avoid premature hardening on the mica tape, e.g. during storage of the mica tape or during the impregnation procedure.

This composite is then saturated with an impregnation resin, preferably in a vacuum-pressure impregnation procedure (VPI procedure). Materials used as impregnation resin are—as already mentioned—primarily resins based on epoxy resin, because when these are used it is possible to omit additional solvents. These resins moreover have good vacuum resistance, low volume shrinkage, and high adhesive bond strength in relation to the mica tape. The epoxy resin is kept at temperatures of, for example, 60° C. to 80° C. in the impregnation container in order that its viscosity is appropriate in particular for the VPI procedure. However, that necessitates a hardener—which is present in a mixture with the epoxy resin component in the impregnation container—that remains unreactive at these temperatures and becomes reactive only at significantly higher temperatures of the hardening procedure (>120° C.). The hardener moreover must also ensure that the impregnation cycle is short and that loss due to drip-off after the impregnation procedure is small. Compounds therefore suitable as hardeners for the epoxy-resin-based impregnation resin are carboxylic anhydrides, e.g. hexahydrophthalic anhydride (HHPA) and methylhexahydrophthalic anhydride (MHHPA), which however are suspected of being hazardous to health, and should therefore be excluded from the production process.

It is therefore an object of the present invention here to provide simple mixtures which in particular when used in the production of insulation for medium- and high-voltage devices in the VPI process, avoid the use of conventional hardeners, in particular carboxylic anhydrides.

This object is achieved in the invention via an impregnation resin mixture with the following composition:
a) at least one epoxy resin component selected from the group of the poly epoxides based on bisphenol A and/or F and of advancement resins produced therefrom, based on epoxidized halogenated bisphenols and/or on epoxidized novolacs, and/or polyepoxyester based on phthalic acid or hexahydrophthalic acid, or based on terephthalic acid, or of epoxidized polyaddition products made of dicyclopentadiene and phenol or of cycloaliphatic compounds,
b) as reactive diluents, 2 to 30% by weight of lactones, based on the entirety of the epoxy resin components,
c) $BCl_3$ and/or $BCl_3$ complexes and/or a compound selected from the group of the imidazoles and
d) optionally further additives,
where the impregnation resin mixture comprises no carboxylic anhydrides.

Surprisingly, the impregnation resin mixture of the invention exhibits a low viscosity—in particular required for the VPI procedure—comparable with that of impregnation resin mixtures comprising carboxylic anhydrides, and good stability in storage. It is moreover possible to achieve glass transition temperatures >120° C., thus avoiding premature onset of curing in the impregnation bath.

Epoxy resins used can comprise one or more components selected from the group of the polyepoxides based on bisphenol A and/or F and of advancement resins produced therefrom, based on epoxidized halogenated bisphenols and/or on epoxidized novolacs, and/or polyepoxy esters based on phthalic acid or hexahydrophthalic acid, or based on terephthalic acid, or of epoxidized polyaddition products made of dicyclopentadiene and phenol or of cycloaliphatic compounds.

Resin components used therefore comprise by way of example epoxidized phenol novolacs (condensate of phenol and, for example, formaldehyde and/or glyoxal), epoxidized cresol novolacs, bisphenol-A-based polyepoxides (including, for example, product of bisphenol A and tetraglycidylmethylenediamine), epoxidized halogenated bisphenols (e.g. tetrabromobisphenol-A-based polyepoxides) and/or bisphenol-F-based polyepoxides, and/or epoxidized novolac and/or epoxy resins based on triglycidyl isocyanurates. Cyclic epoxy resins that may be mentioned comprise the diepoxides of cycloaliphatic esters of dicarboxylic acids, for example diglycidyl hexahydrophthalate.

The epoxy equivalent of all of these resins is preferably 100 to 2000 g/eq. Resin components that can be used inter alia are the following: by way of example, polyepoxides based on bisphenol A (e.g. Epikote® 162 or 828) and/or bisphenol F (e.g. Epikote® 158 or 862), and also mixtures thereof, and cycloaliphatic epoxy resins (e.g. Epikote® 760—products obtainable from Hexion Inc.).

The impregnation resin mixture of the invention moreover comprises lactones. Epoxy resin mixtures comprising lactones are known from the prior art: U.S. Pat. Nos. 3,294,743 and 3,382,210 disclose corresponding mixtures. However, the mixtures disclosed in those documents comprise, as curing catalyst, carboxylic anhydrides and/or $BF_3$ complexes, and it has been found that use of $BF_3$ complexes in the VPI process is unsuitable because hardening takes place at relatively low temperatures and therefore before the material leaves the impregnation bath. The intention is moreover to omit use of carboxylic anhydrides for the abovementioned reasons.

Lactones are heterocyclic compounds which have an ester bond within the molecule, i.e. an oxygen bridge directly at the carbon atom of a carbonyl group. Derivatives whose lactone ring is unsaturated or comprises other heteroatoms are also regarded as lactones.

Frequently encountered members of this group of substances are:

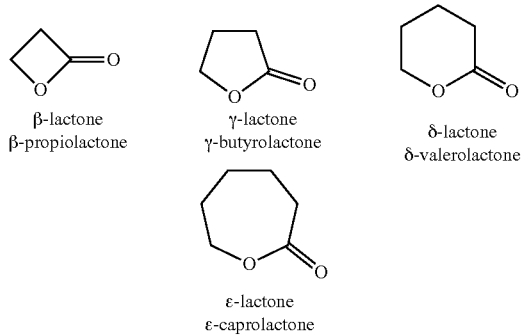

β-lactone
β-propiolactone

γ-lactone
γ-butyrolactone

δ-lactone
δ-valerolactone

ε-lactone
ε-caprolactone

Preferred lactone used is ε-caprolactone, on grounds of commercial availability.

At a concentration of 2 to 30% by weight in the mixture of the invention, the lactones act as reactive diluents, i.e. they are incorporated by copolymerization into the polymer network, and production of volatile substances that pollute the environment is thus prevented.

The impregnation resin mixture comprises, based on the quantity of all of the epoxy resin components, 2 to 30% by weight of lactones. At <2% by weight, viscosity remains too high for processing, and at proportions >30% by weight of lactone the glass transition temperature ($T_G$) of the mixture is too low. It is particularly preferable to use from 5 to 20% by weight of lactone, because this achieves an ideal balance between viscosity and glass transition temperature of the mixture, and also the vapor pressure of the lactone.

The impregnation resin mixture of the invention moreover comprises the catalyst $BCl_3$ that promotes homopolymerization of the epoxy resin component(s), and/or comprises $BCl_3$ complexes and/or a compound from the group of the imidazoles. Use of $BCl_3$ and/or $BCl_3$ complexes has the advantage, in particular in relation to the boron halide complexes known from the prior art, for example $BF_3$ compounds, that the former compounds have adequate latency. The reactivity of, for example, $BF_3$ compounds is in particular too high for the VPI process, and so the usual temperatures prevailing in that process would render the impregnation bath unstable, and would disturb the smooth-running of any impregnation procedure, because hardening would begin in the impregnation bath.

Imidazoles in particular have the attendant advantage that they can advantageously be added at low levels and therefore in efficient manner (preferably between 0.2 and 4% by weight) and nevertheless bring about an excellent glass transition temperature ($T_g$) which provides the desired network density to the hardened resin. Imidazoles used can comprise unsubstituted or substituted alkyl- or phenylimidazoles. Examples that may be mentioned are 2-methylimidazole and 2-ethyl-4-methylimidazole, and particular preference is given here to use of unsubstituted 2-phenylimidazole.

The concentration of $BCl_3$ and/or $BCl_3$ complexes and/or a compound from the group of the imidazoles is preferably 0.2 to 8% by weight, more preferably in the case of $BCl_3$ and/or $BCl_3$ complexes 0.5 to 6% by weight and—as previously mentioned as preferred particularly for imidazoles—between 0.2 and 4% by weight, based on the entirety of the epoxy resin components. The concentration is dependent on the combination of the epoxy resin components used, and on the selection of $BCl_3$ and/or $BCl_3$ complexes and/or a compound from the group of the imidazoles.

The impregnation resin mixture of the invention can optionally comprise further additives, e.g. processing aids or wetting agents, which serve to control surface tension. Preference is given to the addition of constituents having curing effects, e.g. polyols such as polypropylene glycols for flexibilization, but the intention here is complete avoidance of use of anhydrides in the impregnation resin.

The advantage of the impregnation resin mixture of the invention at least comprising one epoxy resin component, one lactone and $BCl_3$ and/or $BCl_3$ complexes and/or a compound selected from the group of the imidazoles is that addition of the lactone acting as reactive diluent enabled ideal adjustment of viscosity despite the presence, in the mixture, of resin and a curing component at processing temperatures of 40 to 80° C. At the same time, it was possible to omit use of substances hazardous to health, for example carboxylic anhydrides. An impregnation resin mixture is thus provided that is stable at relatively high temperatures and is ready for processing for various applications.

The impregnation resin mixture of the invention is—as previously mentioned—preferably intended for use for the insulation of medium- and high-voltage devices, in particular generators and motors. In that context, it can be used generally for any impregnation process, but preference is given to using the VPI process. The impregnation resin mixture of the invention is used as saturation resin in that process, where insulation tape, or no insulation tape, may have been used for winding around the conductor to be insulated.

However, it is generally also possible that the impregnation resin mixture of the invention is used for the coating of fibers, woven fabrics, laid scrims, knitted fabrics and the like made of organic or inorganic materials, e.g. aramid, polyamide, polyester, glass, stone, metal or carbon for the production of corresponding composite materials in various processes such as RTM, SMC or filament winding, for example in the automobile industry, aerospace technology or wind turbines.

Another embodiment of the invention consists in use of an impregnation resin mixture for the production of insulation of a conductor to be insulated, for a process comprising the following steps:

(I) provision of an insulation tape which comprises a nonconductive material and which comprises a reinforcement layer, these having been adhesive-bonded to one another by means of a composition, where the composition comprises
a) at least one epoxy resin component or one novolac, the molar mass of the novolac being 250 to 1000 g/mol, and also
b) $BCl_3$ and/or $BCl_3$ complexes and/or a compound selected from the group of the imidazoles, and also
c) optionally further additives, (II) winding the insulation tape around the electrical conductor and (III) impregnation of the insulation tape wound around the conductor with an impregnation resin mixture comprising the following constituents:

d) at least one epoxy resin component selected from the group of the polyepoxides based on bisphenol A and/or F and of advancement resins produced therefrom, based on epoxidized halogenated bisphenols and/or on epoxidized novolacs, and/or polyepoxy esters based on phthalic acid or hexahydrophthalic acid, or based on terephthalic acid, or of epoxidized polyaddition products made of dicyclopentadiene and phenol or of cycloaliphatic compounds, e) as reactive diluents, 2 to 30% by weight of lactones, based on the entirety of the epoxy resin components, and f) optionally further additives, where the impregnation resin mixture and the composition of the insulation tape comprise no carboxylic anhydrides.

The composition used in the invention for the process is applied as adhesive, in conventional manner by means of spreading or doctoring, or through nozzles, between the nonconductive material, preferably mica, to the reinforcement layer, i.e. the backing tape, which is preferably composed of a woven fabric, knitted fabric, nonwoven web or foil made of glass and/or rockwool and/or polyimide and/or polyester and/or quartz. This gives a composite saturated over a large area and made of mica paper coated on one or more sides with reinforcement layers. The insulation tape preferably comprises 5 to 20% by weight of the composition, based on total mass (backing tape, nonconductive material, adhesive).

The epoxy resins used for the insulation tape composition are known from the prior art, and the polymers previously mentioned for the impregnation resin mixture, namely one or more epoxy resin components selected from the group of the polyepoxides based on bisphenol A and/or F and of advancement resins produced therefrom, based on epoxidized halogenated bisphenols and/or on epoxidized novolacs, and/or polyepoxy esters based on phthalic acid or hexahydrophthalic acid, or based on terephthalic acid, or of epoxidized polyaddition products made of dicyclopentadiene and phenol or of cycloaliphatic compounds, can in turn preferably be used here.

It is moreover possible to use novolacs instead of epoxy resin components for the production of the mica tape. These are known from the prior art. They are produced through condensation of a substituted or unsubstituted phenol with an aldehyde, the molar mass of the resultant novolac being 250 to 1000 g/mol (measured in accordance with DIN 55672-1). It is therefore preferable to react mononuclear substituted or unsubstituted phenols (e.g. phenol, cresols and/or p-tert-butylphenol) with aldehydes (preferably formaldehyde) under acidic conditions. These compounds are readily available. The catalysts most frequently used for the acidic condensation are oxalic acid, hydrochloric acid, p-toluenesulfonic acid, phosphoric acid and sulfuric acid. Typical molar ratios in the reaction mixture here are 0.75-0.85 mol of formaldehyde to 1 mol of phenol (F/P=0.75-0.85). The condensation is terminated when a molar mass of 250 to 1000 g/mol, preferably 250 to 500 g/mol, has been achieved, because this permits adjustment to an ideal viscosity of the composition, this being important for application to the backing tape.

The novolacs used in the invention are obtainable commercially, for example as Bakelite®PH 8505 (product of Hexion GmbH).

Use of novolacs has the advantage that these firstly act as adhesive for the mica tape and secondly can be used as curing component for the epoxy resin present in the impregnation resin mixture.

The composition of the insulation tape moreover comprises, for the inventive use, $BCl_3$ and/or $BCl_3$ complexes and/or a compound selected from the group of the imidazoles, preferably 1 to 30% by weight, more preferably 3-30% by weight, based on the weight of the epoxy resin component or of the novolac. These compounds initiate the homopolymerization of the impregnation resin mixture and accelerate the curing procedure of all of the saturated layers; it is thus possible to optimize the hardening time.

The composition of the insulation tape can optionally comprise, as further constituent, further additives, e.g. processing aids (e.g. solvents, for example methyl ethyl ketone), coupling agents (e.g. silanes), or else wetting agents. These additives have an advantageous effect on the production and properties of the insulation tape. The composition therefore advantageously comprises by way of example 50-90% by weight of an epoxy resin component or a novolac, 1-30% by weight of $BCl_3$ and/or $BCl_3$ complexes and/or a compound selected from the group of the imidazoles and 0-49% by weight of further additives, based on the total weight of all of the components of the composition.

In this inventive use, the insulation tape coated with the composition is wound around the conductor to be insulated. During the impregnation procedure, the impregnation resin mixture, heated (to about 40-80° C.), which comprises a) at least one epoxy resin component selected from the group of the polyepoxides based on bisphenol A and/or F and of advancement resins produced therefrom, based on epoxidized halogenated bisphenols and/or on epoxidized novolacs, and/or polyepoxy esters based on phthalic acid or hexahydrophthalic acid, or based on terephthalic acid, or of epoxidized polyaddition products made of dicyclopentadiene and phenol or of cycloaliphatic compounds, b) as reactive diluents, 2 to 30% by weight of lactones, based on the entirety of the epoxy resin components, c) optionally further additives, but no carboxylic anhydrides, saturates the conductor around which the insulation tape has been wound.

The preferred embodiments previously mentioned above in relation to the selection and concentration of the epoxy resin component, lactones and additives for the impregnation resin mixture are likewise used here.

By virtue of the combination of the insulation tape which comprises at least one epoxy resin component or one novolac and $BCl_3$ and/or $BCl_3$ complexes and/or a compound selected from the group of the imidazoles with the impregnation resin mixture which comprises at least one epoxy resin component and, as reactive diluents, 2 to 30% by weight of lactones, for a production process for the insulation of a conductor, it is possible to omit use of carboxylic anhydrides that are hazardous to health. The impregnation resin mixture moreover has the desired viscosity and latency to ensure good saturation of the conductor around which the insulation tape has been wound.

The impregnation in the step (III) particularly preferably takes place in vacuo (VPI process); this ensures almost complete saturation of the composition made of the conductor around which the insulation tape has been wound, with the impregnation resin mixture. The impregnation is generally followed by hardening in a drying oven in the temperature range 8° C. to 180° C., as required by the impregnation resin used.

A working example will be used to provide further details of the invention.

To produce the impregnation resin mixture, 15 parts by weight of ε-caprolactone are admixed and homogenized with 25 parts by weight of Epikote® Resin 162 and 75 parts by weight of Epikote® Resin 158. The appropriate quantity of catalyst trifluoro(isopropylamine)boron ($BF_3$ isopropylamine complex) or trichlorodimethyloctylamineboron ($BCl_3$ dimethyloctylamine complex) is admixed with the resultant mixture, and the glass transition temperature (IEC 61006) is determined as a function of concentration.

TABLE 1

| | DSC glass transition temperature [° C.] | |
| --- | --- | --- |
| Parts by weight of catalyst | Mixture with $BF_3$ isopropylamine complex | Mixture with $BCl_3$ dimethyloctylamine complex |
| 1 | 30 | 33 |
| 2 | 56 | 75 |
| 3 | 101 | 122 |
| 4 | 116 | 133 |
| 5 | 119 | 133 |

From table 1 it can be seen that, in comparison with the catalyst $BF_3$ isopropylamine complex, use of $BCl_3$ dimethyloctylamine complex leads to higher glass transition temperatures.

On the basis of these results, storage tests at 40° C. based on viscosity measurements are carried out with the mixture with 5 parts by weight of $BF_3$ isopropylamine complex and with 4 parts by weight of $BCl_3$ dimethyloctylamine complex (Tab. 2).

TABLE 2

| | Viscosity at 40° C. (DIN 53015) | |
| --- | --- | --- |
| Days | Mixture with $BF_3$ isopropylamine complex | Mixture with $BCl_3$ dimethyloctylamine complex |
| 0 | 245.5 mPa * s | 119.0 mPa * s |
| 2 | 279.0 mPa * s | 119.0 mPa * s |
| 4 | 319.0 mPa * s | 119.0 mPa * s |
| 7 | 389.0 mPa * s | 136.0 mPa * s |
| 9 | ** | 136.0 mPa * s |
| 11 | ** | 138.0 mPa * s |
| 14 | ** | 138.0 mPa * s |
| 16 | ** | 154.0 mPa * s |
| 18 | ** | 155.0 mPa * s |
| 21 | ** | 155.0 mPa * s |
| 23 | ** | 157.0 mPa * s |
| 25 | ** | 168.0 mPa * s |
| 28 | ** | 170.0 mPa * s |
| 31 | ** | 170.0 mPa * s |

Table 2 reveals that within 7 days the viscosity of the mixture at 40° C. with $BF_3$ isopropylamine complex increases to a significantly greater extent than the viscosity of the mixture at 40° C. with $BCl_3$ dimethyloctylamine complex.

From tables 1 and 2 it can be seen that impregnation resin mixtures with $BCl_3$ complexes provide mixtures with higher glass transition temperatures; these mixture are therefore suitable for the VPI process. In contrast, because of the lower glass transition temperature, the mixture comprising $BF_3$ complexes cannot be used in the VPI process, because the impregnation resin mixture would harden before the material leaves the impregnation bath.

Impregnation resin mixtures with $BCl_3$ dimethyloctylamine complex moreover exhibit substantially lower viscosity over a long period than mixtures with $BF_3$ isopropylamine complex; this—despite the presence of resin and hardener—provides an advantage in relation to the stability of the impregnation resin mixture in storage.

What is claimed is:

1. A process for producing an insulated electrical conductor, the process comprising:
   (I) forming an insulation tape by applying a composition as adhesive between a nonconductive material and a reinforcement layer, the composition comprising:
      a) at least one epoxy resin component or one novolac, wherein the novolac has a molar mass of 250 to 1000 g/mol;
      b) $BCl_3$, $BCl_3$ complexes, imidazole compounds, or combinations thereof; and
      c) optionally further additives;
   (II) winding the insulation tape around the electrical conductor; and
   (III) impregnating the insulation tape wound around the electrical conductor with an impregnation resin mixture comprising the following constituents:
      d) at least one epoxy resin component selected from polyepoxides based on bisphenol A, advancement resins produced therefrom, polyepoxides based on bisphenol F, advancement resins produced therefrom, polyepoxides based on epoxidized halogenated bisphenols, polyepoxides based on epoxidized novolacs, polyepoxy esters based on phthalic acid, polyepoxy esters based on hexahydrophthalic acid, polyepoxy esters based on terephthalic acid, epoxidized polyaddition products made of dicyclopentadiene and phenol, and epoxidized polyaddition products made of cycloaliphatic compounds;
      e) 2 to 30% by weight of lactones, based on the entirety of the epoxy resin components, and
      f) optionally further additives,
      where the impregnation resin mixture and the composition of the insulation tape comprise no carboxylic anhydrides.

2. The process of claim 1, wherein the impregnation in step (III) takes place in vacuo.

3. The process of claim 1, wherein the non-conductive material is mica.

4. The process of claim 1, wherein the reinforcement layer is composed of a woven fabric, a knitted fabric, a nonwoven web or a foil and is made of at least one of glass, rockwool, polyimide, polyester, and quartz.

5. The process of claim 1, wherein the insulation tape comprises 5 to 20% by weight of the composition, based on total mass of the insulation tape.

6. The process of claim 1, wherein the composition comprises 1 to 30% by weight of the $BCl_3$, $BCl_3$ complexes, imidazole compounds, or combinations thereof, based on the weight of the at least one epoxy resin component or the novolac.

7. The process of claim 1, wherein the composition further comprises
   a) solvents or
   b) coupling agents or
   c) wetting agents.

8. The process of claim 1, wherein the composition comprises
   a) 50-90% by weight of the at least one epoxy resin component or the novolac,
   b) 1-30% by weight of the $BCl_3$, $BCl_3$ complexes, imidazole compounds, or combinations thereof, and
   c) 0-49% by weight of further additives, based on the total weight of all of the components of the composition.

\* \* \* \* \*